(12) United States Patent
Nakayama (10) Patent No.: US 9,156,415 B2
(45) Date of Patent: Oct. 13, 2015

(54) WIRE HARNESS

(75) Inventor: Masashi Nakayama, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 148 days.

(21) Appl. No.: 13/285,344

(22) Filed: Oct. 31, 2011

(65) Prior Publication Data

US 2012/0120629 A1    May 17, 2012

(30) Foreign Application Priority Data

Nov. 12, 2010 (JP) ................. P2010-253825

(51) Int. Cl.
| | | |
|---|---|---|
| *H05K 7/00* | (2006.01) | |
| *H02B 1/20* | (2006.01) | |
| *H01H 85/20* | (2006.01) | |
| *H05K 1/11* | (2006.01) | |
| *B60L 1/00* | (2006.01) | |
| *B60R 16/02* | (2006.01) | |
| *H01B 13/012* | (2006.01) | |
| *H01R 9/00* | (2006.01) | |
| *H02G 3/16* | (2006.01) | |
| *B60R 16/023* | (2006.01) | |

(Continued)

(52) U.S. Cl.
CPC ......... *B60R 16/0207* (2013.01); *B60R 16/0238* (2013.01); *H01B 13/012* (2013.01); *H01R 9/00* (2013.01); *H02B 1/20* (2013.01); *H02G 3/16* (2013.01); *H01B 13/00* (2013.01); *H01R 13/502* (2013.01); *H01R 13/66* (2013.01)

(58) Field of Classification Search
CPC ............... H01B 13/00; H01B 13/012; H01B 13/01209; H01B 13/01218; H01B 13/01227; H01B 13/01236; H01B 13/01245; H01B 13/01263; H01B 13/01272; H01B 13/01281; H01B 13/0129; H01R 13/502; H01R 9/00; H01R 13/66; H02B 1/20; H02G 3/16
USPC ............ 361/833, 819, 826–828, 834; 439/76, 439/76.2; 174/262, 265; 307/9.1; 337/186
See application file for complete search history.

(56) References Cited

U.S. PATENT DOCUMENTS

| | | |
|---|---|---|
| 4,850,884 A | 7/1989 | Sawai et al. |
| 5,995,380 A | 11/1999 | Maue et al. |

(Continued)

FOREIGN PATENT DOCUMENTS

| | | |
|---|---|---|
| CN | 1222778 | 7/1999 |
| CN | 1551437 | 12/2004 |

(Continued)

OTHER PUBLICATIONS

Notification of First Office Action issued Dec. 6, 2013 by The State Intellectual Property Office of the People's Republic of China in corresponding Application No. CN 201110332810.3 (3 pages).

(Continued)

*Primary Examiner* — Courtney Smith
*Assistant Examiner* — Zhengfu Feng
(74) *Attorney, Agent, or Firm* — Sughrue Mion, PLLC (57) ABSTRACT

A wire harness includes a relay box having an external shape that is defined by a frame to which one of a mechanical relay cassette and a communication-function-provided relay cassette is replaceably attached, a junction connector having a space in which a communication module is installable, and a junction box having a microcomputer which works a communication function optionally.

2 Claims, 7 Drawing Sheets

(51) Int. Cl.
    *H01B 13/00* (2006.01)
    *H01R 13/502* (2006.01)
    *H01R 13/66* (2006.01)

(56) References Cited

U.S. PATENT DOCUMENTS

| | | | |
|---|---|---|---|
| 6,437,986 | B1 | 8/2002 | Koshiba |
| 6,494,722 | B1 | 12/2002 | Sakamoto et al. |
| 6,597,578 | B2 * | 7/2003 | Shiina et al. .................. 361/728 |
| 6,796,808 | B2 * | 9/2004 | Hosoe et al. .................. 439/76.2 |
| 2002/0197893 | A1 | 12/2002 | Hiroyuki et al. |
| 2007/0093090 | A1 * | 4/2007 | Fujimaki ...................... 439/76.2 |

FOREIGN PATENT DOCUMENTS

| | | |
|---|---|---|
| CN | 1624999 | 6/2005 |
| JP | 8-148037 | 6/1996 |
| JP | 09-233651 | 9/1997 |
| JP | 63-144710 | 6/1998 |
| JP | 02-999708 | 11/1999 |
| JP | 2000-173686 | 6/2000 |
| JP | 2004-355941 | 12/2004 |
| JP | 2005-005148 | 1/2005 |
| JP | 2006-213145 | 8/2006 |
| JP | 2007-123314 | 5/2007 |

OTHER PUBLICATIONS

English-language translation of Notification of First Office Action issued Dec. 6, 2013 by The State Intellectual Property Office of the People's Republic of China in corresponding Application No. CN 201110332810.3 (6 pages).

Notification of Second Office Action issued May 16, 2014 by The State Intellectual Property Office of the People's Republic of China in corresponding Application No. CN 201110332810.3.

Official Action issued by State Intellectual Property Office of the People's Republic of China (SIPO) in a counterpart foreign application mailed on Nov. 2, 2014, and English translation.

Communication dated May 4, 2015 from the State Intellectual Property Office of the P.R.C. in counterpart application No. 201110332810.3.

Communication dated Sep. 24, 2014 from the Japanese Patent Office in counterpart application No. 2010-253825.

* cited by examiner

WIRE HARNESS

BACKGROUND OF THE INVENTION

1. Field of the Invention

The present invention relates to a wire harness, and particularly, to a wire harness capable of easily adding a communication function.

2. Description of Related Art

Cable harnesses for vehicles have been developed in various types from those with less functions for lower-grade vehicles to those with many functions for higher-grade vehicles, to meet a wide variety of requirements. Japanese Unexamined Patent Application Publication No. H08-148037 discloses a higher-grade wire harness provided with a communication function, which is not usually provided for a lower-grade wire harness.

Figure 1:
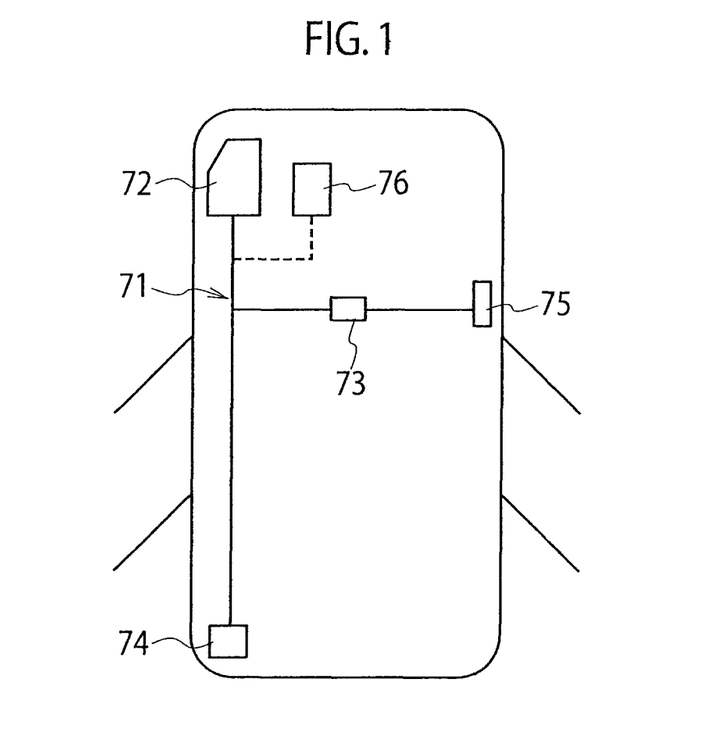
FIG. 1 is a schematic view illustrating a wire harness and a technique of adding a new function thereto according to a related art.

When developing a wire harness, functions must be added or removed depending on requirements. FIG. 1 is a schematic view illustrating an example of a wire harness according to a related art. In FIG. 1, the wire harness 71 installed in a vehicle includes a relay box 72, junction connectors 73 and 74, and a junction box 75. To add a new function to the wire harness 71, the related art must add, for example, a junction box 76 having the required new function to the wire harness 71.

SUMMARY OF THE INVENTION

Adding a new item such as the junction box 76 to recent vehicles, however, is very difficult because, to improve the safety and comfort and reduce the weight, the recent vehicles have nearly no free space for additional items. In particular, adding a communication function to a lower-grade wire harness is laborious because the wire harness has no space for occupation of the communication function.

To solve the problem, the present invention provides a wire harness capable of easily adding a communication function.

According to an aspect of the present invention, the wire harness includes a relay box having an external shape that is defined by a frame to which one of a mechanical relay cassette and a relay cassette having a communication function is replaceably attached, a junction connector incorporating a space in which a communication module is installable, and a junction box having a microcomputer which works a communication function optionally.

According to another aspect of the present invention, the junction connector of the wire harness has a wiring board and a casing, the space in which the communication module is installable is defined by the wiring board and the casing, and the wiring board and communication module form a double-deck structure when the communication module is installed in the space.

DESCRIPTION OF PREFERRED EMBODIMENTS

An embodiment of the present invention will be explained in detail with reference to the drawings.

Wire Harness

Figure 2A:
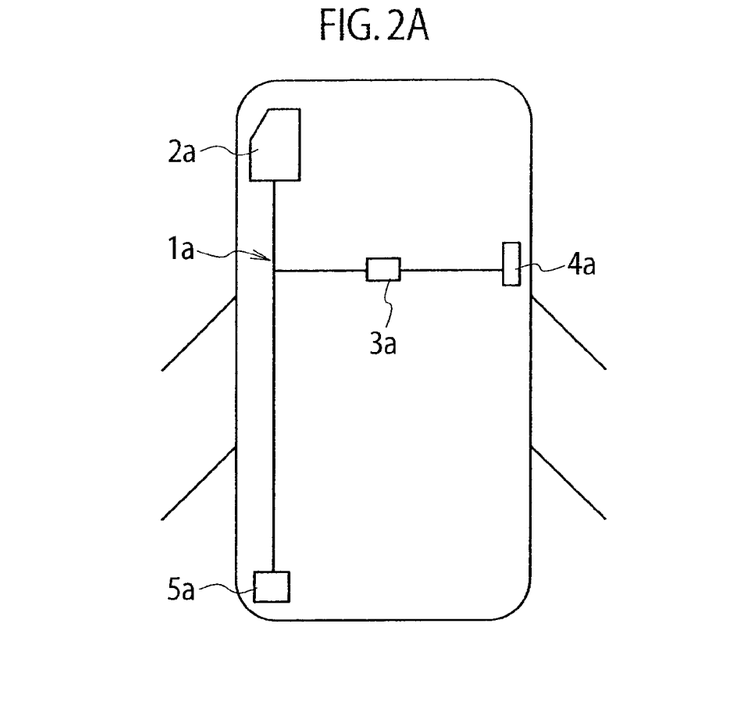
FIGS. 2A and 2B are schematic views illustrating wire harnesses according to an embodiment of the present invention.
Figure 2B:
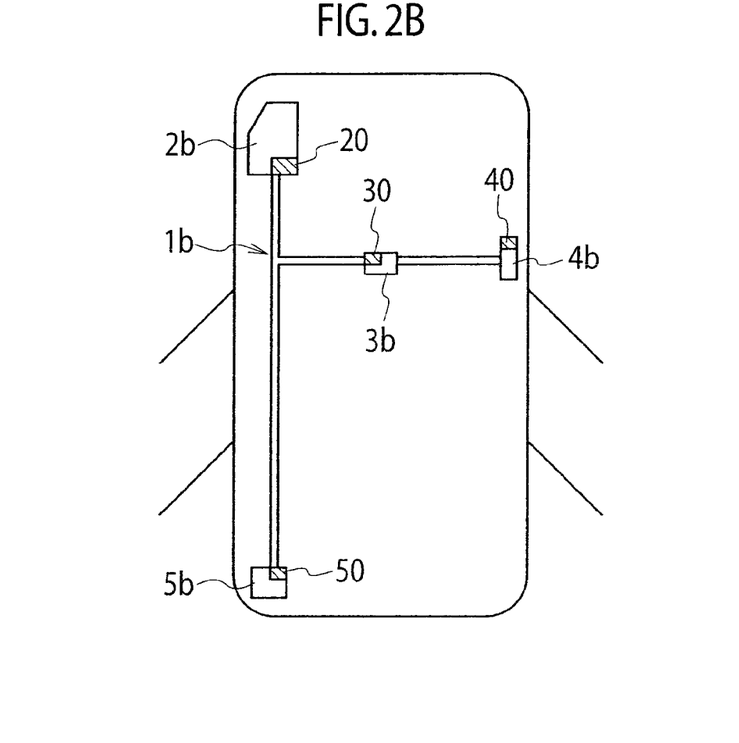

FIGS. 2A and 2B illustrate examples of wire harnesses according to an embodiment of the present invention. The wire harness 1a of FIG. 2A is configured to be installed in a lower-grade vehicle and the wire harness 1b of FIG. 2B is configured to be installed in a higher-grade vehicle.

In FIG. 2A, the wire harness 1a for a lower-grade vehicle has a relay box 2a with a mechanical relay cassette, junction connectors 3a and 5a without a communication module, and a junction box 4a with a microcomputer having no communication function.

In FIG. 2B, the wire harness 1b for a higher-grade vehicle has a relay box 2b with a relay cassette having a communication device 20, junction connectors 3b and 5b with communication modules 30 and 50, and a junction box 4b with a microcomputer 40 having a communication function.

In this way, the wire harness according to the present embodiment employs no communication function when installed in a lower-grade vehicle and easily adds the communication function when installed in a higher-grade vehicle. For this, the relay box, junction box, and junction connector of the wire harness according to the embodiment are each configured to easily add the communication function.

The relay box, junction box, and junction connector that form the wire harness according to the embodiment will be explained in detail.

Relay Box

Examples of the relay box of the wire harness according to the present embodiment will be explained with reference to FIGS. 3A and 3B. The relay box of FIG. 3A corresponds to the relay box 2a of FIG. 2A and is configured to be installed in a lower-grade vehicle. The relay box of FIG. 3B corresponds to the relay box 2b of FIG. 2B and is configured to be installed in a higher-grade vehicle.

Figure 3A:
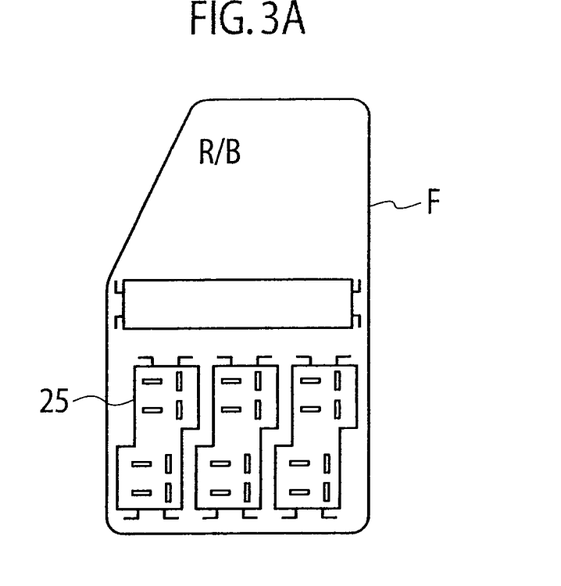
FIGS. 3A and 3B are schematic views illustrating examples of relay boxes included in the wire harnesses of FIGS. 2A and 2B.
Figure 3B:
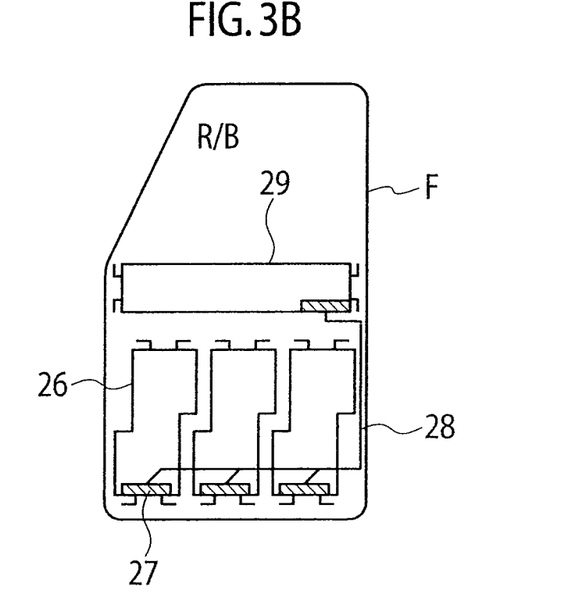

In FIG. 3A, the relay box for a lower-grade vehicle has a frame F in which a plurality of mechanical relay cassettes 25 are installed. In FIG. 3B, the relay box for a higher-grade vehicle has a frame F in which a plurality of relay cassettes 26 each having a communication function are installed. The relay cassette 26 with the communication function is provided with a communication device 27, which is connected through a communication line to an electronic unit 29.

The mechanical relay cassette 25 and communication-function-provided relay cassette 26 have the same shape, and therefore, are replaceable with each other with respect to the frame F that defines an external shape of the relay box.

Simply replacing the mechanical relay cassette 25 with the relay cassette 26 having a communication function, the relay box of FIG. 3A (the relay box 2a of FIG. 2A) obtains the communication function without extra parts. The relay box according to the present embodiment, therefore, is adoptable for both the lower- and higher-grade vehicles.

Figure 4A:
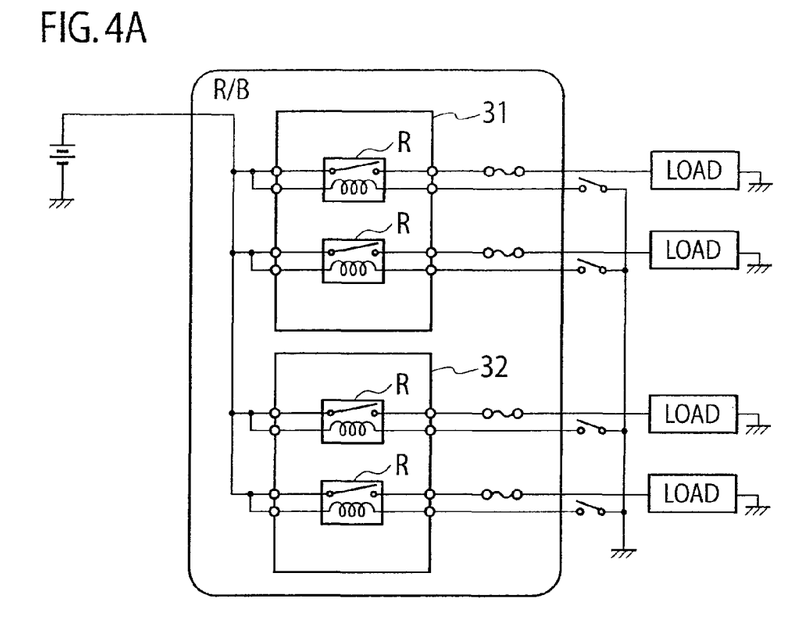
FIGS. 4A and 4B are circuit diagrams illustrating examples of relay boxes included in the wire harnesses of FIGS. 2A and 2B.

Examples of circuits in relay boxes according to the present embodiment will be explained with reference to FIGS. 4A and 4B. The circuit of FIG. 4A is of a relay box to be installed in a lower-grade vehicle, such as the relay box 2a of FIG. 2A. The circuit of FIG. 4B is of a relay box to be installed in a higher-grade vehicle, such as the relay box 2b of FIG. 2B.

In FIG. 4A, the relay box circuit for a lower-grade vehicle has relay cassettes 31 and 32. Each of the relay cassettes 31 and 32 has mechanical relays R each being connected through a fuse to a load. In FIG. 4B, the relay box circuit for a higher-grade vehicle has relay cassettes 35 and 36 each including a communication device 37. The communication device 37 includes a communication block 38 for carrying out signal transmission and reception and a control block 39 for controlling the relays. The relay cassettes 35 and 36 may have, in addition to the mechanical relays R, semiconductor switches S such as transistors or SSRs.

Figure 4B:
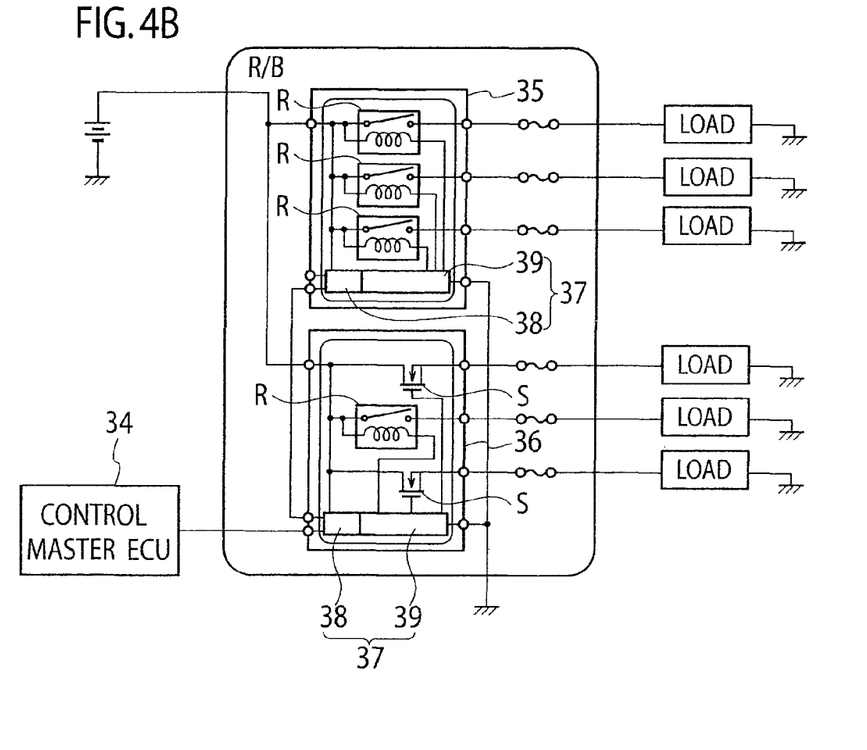

In FIG. 4B, a control master ECU 34 transmits a control instruction to the control block 39 of the relay cassette 36. According to the control instruction, the control block 39 controls the relays R and semiconductor switches S. The communication block 38 of the relay cassette 36 transmits the control instruction to the relay cassette 35. Receiving the control instruction, the control block 39 of the relay cassette 35 controls the relays R.

Each relay box circuit is formed by arranging, on a frame F, wiring patterns that meet the grade and specification of a vehicle in which the relay box is installed and by attaching appropriate relay cassettes to the wiring patterns on the frame F.

Junction Connector

Figure 5A:
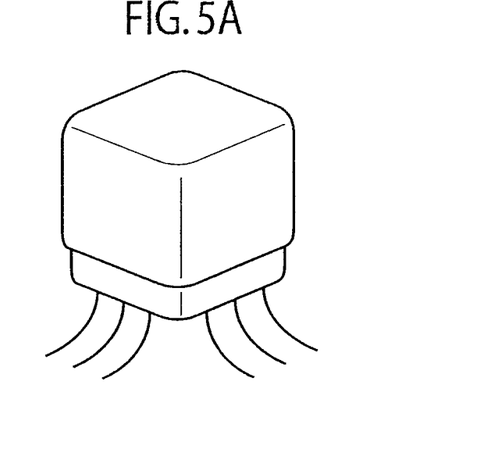
FIGS. 5A, 5B, and 5C are views illustrating examples of junction connectors included in the wire harnesses of FIGS. 2A and 2B.
Figure 5B:
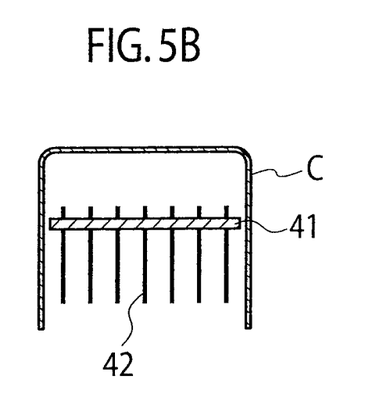
Figure 5C:
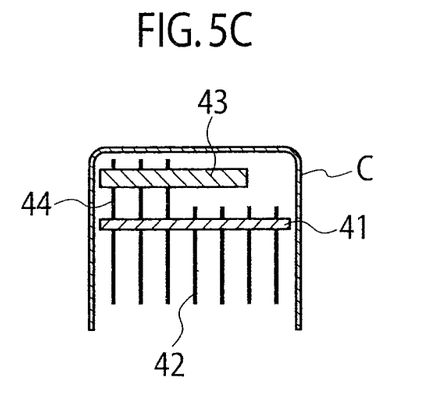

Examples of the junction connector according to the embodiment will be explained with reference to FIGS. 5A to 5C, in which FIG. 5A is a perspective external view common to a junction connector for a lower-grade vehicle and a junction connector for a higher-grade vehicle, FIG. 5B is a sectional view illustrating the junction connector for a lower-grade vehicle corresponding to one of the junction connectors 3a and 5a of FIG. 2A, and FIG. 5C is a sectional view illustrating the junction connector for a higher-grade vehicle corresponding to one of the junction connectors 3b and 5b of FIG. 2B.

In FIG. 5B, the junction connector for a lower-grade vehicle has a casing C and a wiring board 41 arranged in the casing C. A terminal 42 is extended from the wiring board 41. In FIG. 5C, the junction connector for a higher-grade vehicle has basically the same structure as the junction connector for a lower-grade vehicle of FIG. 5B and is additionally provided with a communication module 43 in a space defined by an upper surface of the wiring board 41 and an inner surface of the casing C. The communication module 43 is connected through a terminal 44 to the wiring board 41.

In this way, the junction connector according to the present embodiment has an occupation space in the casing C for the communication module 43. When the communication module 43 is added, the wiring board 41 and communication module 43 form a two-deck structure. Namely, the embodiment effectively uses the space in the junction connector, to accommodate the communication module 43.

Examples of circuits in the junction connectors according to the present embodiment will be explained with reference to FIGS. 6A and 6B. The circuit of FIG. 6A is of the junction connector for a lower-grade vehicle and the circuit of FIG. 6B is of the junction connector for a higher-grade vehicle.

Figure 6A:
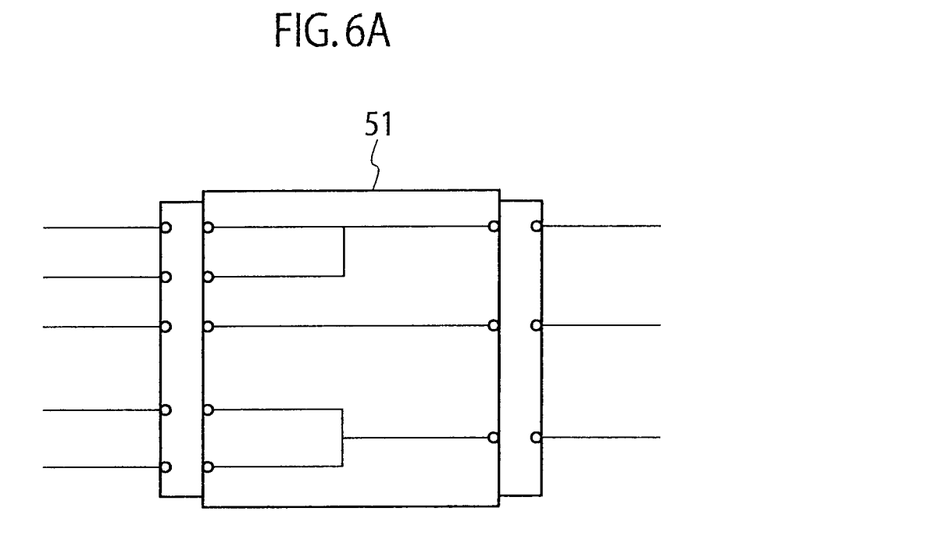
FIGS. 6A and 6B are circuit diagrams illustrating examples of junction connectors included in the wire harnesses of FIGS. 2A and 2B.
Figure 6B:
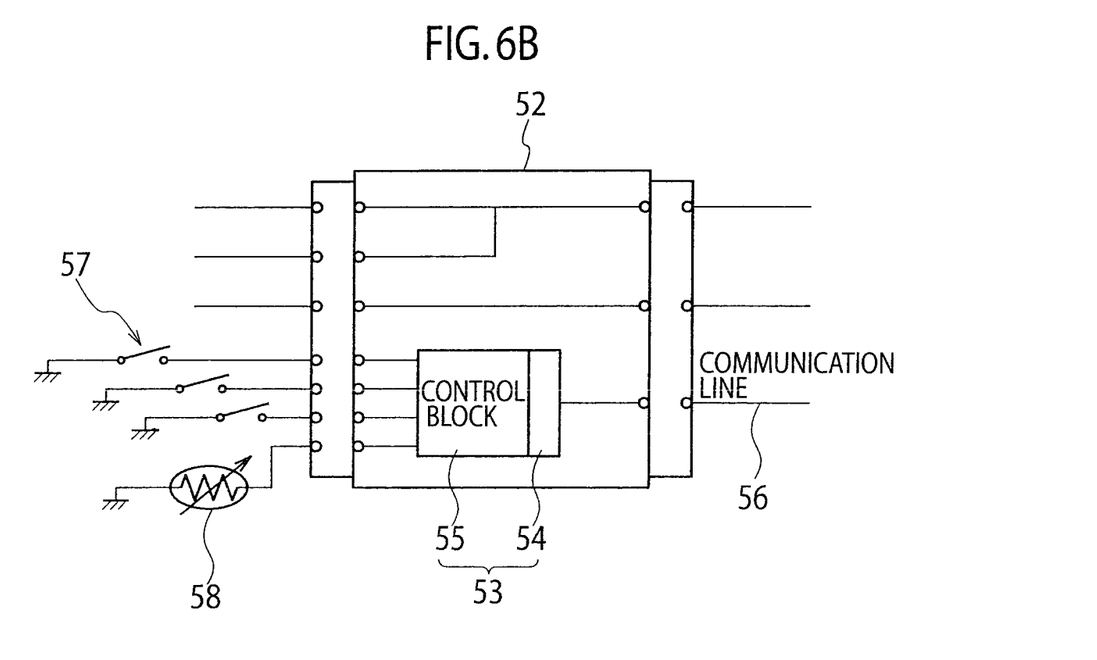

In FIG. 6A, the junction connector circuit 51 for a lower-grade vehicle includes input wires that are divided into output wires. In FIG. 6B, the junction connector circuit 52 for a higher-grade vehicle includes input wires that are divided into output wires and a communication module 53. The communication module 53 has a communication block 54 for carrying out signal transmission and reception and a control block 55 for controlling switches and sensors. The junction connector circuit 52 receives a control instruction through a communication line 56, and according to the control instruction, controls the switches 57 and sensor 58.

Junction Box

An example of the junction box according to the present embodiment will be explained with reference to FIG. 7. The junction box 61 of FIG. 7 corresponds to one of the junction boxes 4a and 4b of FIGS. 2A and 2B.

Figure 7:
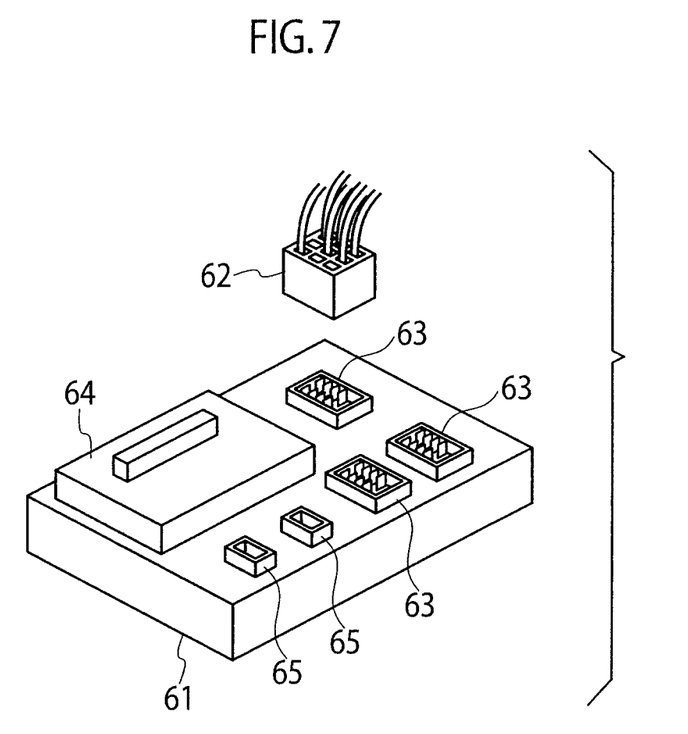
FIG. 7 is a perspective view illustrating an example of a junction box included in the wire harnesses of FIGS. 2A and 2B.

In FIG. 7, the junction box 61 has connectors 63 to be connected to a wire harness 62, a fuse box 64, and relay boxes 65. The junction box 61 may have only required ones of the components 63, 64, and 65, or may have any other components having different functions.

The junction box 61 has a microcomputer (not illustrated) such as a body ECU. The microcomputer is adapted to work a communication function optionally. For a lower-grade vehicle, the junction box 61 is provided with a microcomputer being inoperative of the communication function, and for a higher-grade vehicle, the junction box 61 is provided with a microcomputer working the communication function. In this way, the junction box 61 according to the embodiment is easy to have, or not to have a communication function.

Effect of the Invention

As explained above, the wire harness according to the embodiment includes the relay box, junction connector, and junction box each being capable of easily adding a communication function without expanding the wire harness with additional parts. Accordingly, the wire harness according to the embodiment is flexibly applicable to a wide variety of vehicles from lower-grade vehicles to higher-grade vehicles.

The junction connector of the wire harness according to the embodiment includes a wiring board and a casing between which a space is defined to contain a communication module. When the communication module is arranged in the space, the wiring board and communication module form a two-deck structure in the junction connector. Namely, the junction connector according to the embodiment effectively uses the internal space to incorporate the communication module.

The present invention is applicable to power supply and signal communication in a various types of vehicles.

This application claims benefit of priority under 35 USC §119 to Japanese Patent Application No. 2010-253825, filed on Nov. 12, 2010, the entire contents of which are incorporated by reference herein. The scope of the invention is defined with reference to the following claims.

What is claimed is:

1. A wire harness comprising:
   a relay box having an external shape defined by a frame, wherein the relay box receives a plurality of mechanical relay cassettes or a plurality of communication-function relay cassettes having substantially the same shape, and the plurality of mechanical relay cassettes or the plurality of communication-function relay cassettes are replaceably mounted to the frame and inside the relay box;
   a junction connector incorporating an occupation space of a communication module; and
   a junction box having a microcomputer, the microcomputer works a communication function device of each of the communication-function relay cassettes, wherein the communication function devices transmit and receive signals and controls the communication-function relay cassettes and the communication module transmits and receives signals and controls the junction connector.

2. The wire harness of claim 1, wherein:

the junction connector has a wiring board and a casing;

the occupation space is defined by the wiring board and the casing; and the wiring board and the communication module form a double-deck structure when the communication module is installed in the occupation space.

\* \* \* \* \*